(12) United States Patent
So (10) Patent No.: US 8,190,164 B2
(45) Date of Patent: May 29, 2012

(54) APPARATUS AND METHOD FOR DATA COMMUNICATION IN WIRELESS COMMUNICATION SYSTEM

(75) Inventor: Jae-Woo So, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 947 days.

(21) Appl. No.: 11/761,749

(22) Filed: Jun. 12, 2007

(65) Prior Publication Data

US 2007/0293231 A1 Dec. 20, 2007

(30) Foreign Application Priority Data

Jun. 14, 2006 (KR) .......................... 10-2006-0053328

(51) Int. Cl.
*H04W 72/00* (2009.01)

(52) U.S. Cl. ..................... 455/450; 455/451; 455/452.1; 370/329

(58) Field of Classification Search .................. 455/451, 455/452.1, 452.2, 453–455, 464, 502, 158.1, 455/165.1, 183.1, 208, 265, 434–450, 560–562.1; 370/332, 310, 319, 322, 326–330, 335–338, 370/340–356, 310.2, 312, 324, 395.4, 395.41, 370/432, 436, 437, 443, 480, 503, 509–514
See application file for complete search history.

(56) References Cited

U.S. PATENT DOCUMENTS

| | | | | |
|---|---|---|---|---|
| 5,946,306 A | * | 8/1999 | Talarmo | 370/337 |
| 7,564,829 B2 | * | 7/2009 | Jin et al. | 370/343 |
| 2004/0127226 A1 | * | 7/2004 | Dugad et al. | 455/450 |
| 2005/0063330 A1 | * | 3/2005 | Lee et al. | 370/328 |
| 2005/0232181 A1 | * | 10/2005 | Park et al. | 370/319 |
| 2006/0007849 A1 | * | 1/2006 | Kim et al. | 370/208 |
| 2006/0111129 A1 | * | 5/2006 | Ihm et al. | 455/466 |
| 2006/0193286 A1 | * | 8/2006 | Naghian et al. | 370/328 |

FOREIGN PATENT DOCUMENTS

| | | |
|---|---|---|
| KR | 10-2003-0015113 A | 2/2003 |
| KR | 10-2005-0033418 A | 4/2005 |
| KR | 10-0896280 B1 | 5/2009 |

* cited by examiner

*Primary Examiner* — Kent Chang
*Assistant Examiner* — San Htun
(74) *Attorney, Agent, or Firm* — Jefferson IP Law, LLP (57) ABSTRACT

An apparatus and method for periodically allocating uplink resources in a broadband wireless communication system are provided. Base Station (BS) includes a resource allocator for allocating periodic uplink (UL) resources to a terminal, a control information generator for generating a resource allocation message for the terminal using resource allocation information from the resource allocator, generating and outputting control information including the generated resource allocation message, and a transmitter for transmitting the control information from the control information generator.

51 Claims, 8 Drawing Sheets

APPARATUS AND METHOD FOR DATA COMMUNICATION IN WIRELESS COMMUNICATION SYSTEM

PRIORITY

This application claims the benefit under 35 U.S.C. §119 (a) to a Korean patent application filed in the Korean Intellectual Property Office on Jun. 14, 2006 and assigned Serial No. 2006-53328, the entire disclosure of which is hereby incorporated by reference.

BACKGROUND OF THE INVENTION

1. Field of the Invention

The present invention relates generally to an apparatus and method for data communication in a wireless communication system. More particularly, the present invention relates to an apparatus and method for periodically allocating uplink resources in a broadband wireless communication system.

2. Description of the Related Art

A number of radio communication technologies have been suggested as candidates for rapid mobile communications. Among those, the Orthogonal Frequency Division Multiplexing (OFDM) scheme is accepted as the most dominant next-generation radio communication technology. In the future, it is anticipated that the OFDM scheme will be adopted to most radio communication technologies. Wireless Metropolitan Area Network (WMAN), which is specified by IEEE 802.16 of 3.5G technology and which is incorporated herein by reference, also adopts the OFDM scheme as a standard.

To transmit data in the uplink in OFDM based broadband wireless communication system, a terminal needs to be allocated uplink resources from a Base Station (BS). The resource is represented in the form of (symbol, subchannel) in two dimensions. The symbol indicates the time and the subchannel indicates the frequency. In general, the basic unit of the uplink resource allocation is a slot, and the amount of the resources is represented as the number of slots.

In the IEEE 802.16 system, the terminal is allocated the uplink resource as follows.

The terminal requests an uplink transmission by sending a ranging code to the BS. The BS sends to the terminal an allocation message (CDMA allocation UL-MAP IE( )) including uplink resource (the number of slots) information allowing it to send a bandwidth request message.

The terminal sends a bandwidth request message to the BS over the slots allocated using the allocation message. The BS allocates the uplink resources to the terminal by analyzing the bandwidth request message, and sends an uplink map message (UL-MAP IE( )) including the allocated resource information to the terminal. Next, the terminal transmits UL data using the resources allocated from the BS.

Figure 1:
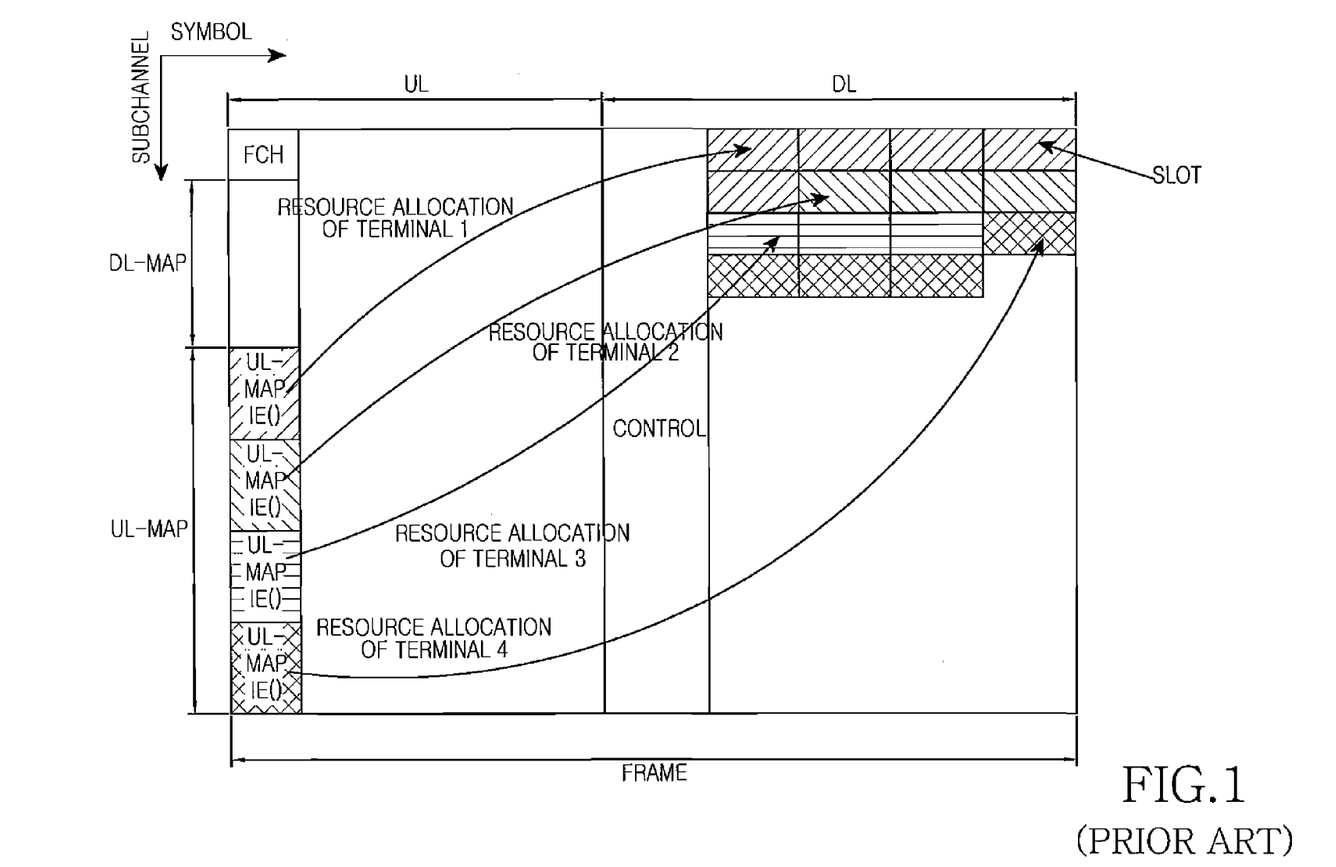
FIG. 1 depicts a conventional uplink resource allocating method in a broadband wireless communication system.

FIG. 1 depicts a conventional uplink resource allocating method in a broadband wireless communication system.

In FIG. 1, four terminals are assigned five, three, three, and four uplink (UL) slot resources through four UL-MAP IE( ) respectively. Unlike the downlink using the two-dimensional resource allocation method, the uplink allots the resources in one dimension. Each UL-MAP IE( ) contains slot number information (duration information). The terminal recognizes the resources allocated to the other terminals by sequentially interpreting UL-MAP IE( ), and determines a number of slots starting from the start of the allocated slots as its own resources.

Table 1 shows UL-MAP IE( ) for allocating the uplink resource.

TABLE 1

```
UL-MAP IE( ) {
   CID
   UIUC
   Duration
   Repetition coding indication
}
```

In Table 1, the resource allocating message UL-MAP IE( ) includes Connection IDentifier (CID) information for distinguishing services and terminals, Uplink Interval Usage Code (UIUC) information for designating a modulation scheme, Duration information for indicating a number of allotted slots, and Repetition coding indication information for designating a number of repetition codings.

To allocate the same uplink resources to the four terminals in each frame, four resource allocation messages of FIG. 1 need to be broadcast in every frame. However, in case of a service where the terminal periodically transmits the uplink data (e.g., VoIP service), resources may be unnecessarily wasted as the BS allocates the uplink resources using the resource allocation messages in every frame.

The IEEE 802.16 system maximizes a degree of freedom in the frame constitution by constituting the minimum transmission unit (data burst) of the downlink using one subchannel and one symbol and constituting the minimum transmission unit of the uplink using one slot. However, as the degree of freedom increases, control information to be transmitted also increases. Thus, when a plurality of user data exists within the frame, the information informed to the users using DL-MAP and UL-MAP act as considerable overhead. At the worst, the system throughput may be degraded because of the small amount of allocable resources for the actual traffics.

SUMMARY OF THE INVENTION

An aspect of the present invention is to address at least the above-mentioned problems and/or disadvantages and to provide at least the advantages described below. Accordingly, an aspect of the present invention is to provide an apparatus and method for decreasing a control information size broadcast in a broadband wireless communication system.

Another aspect of the present invention is to provide an apparatus and method for periodically allocating uplink resources in a broadband wireless communication system.

A further aspect of the present invention is to provide an apparatus and method for periodically allocating resources with respect to services which generate periodic packets in a broadband wireless communication system.

According to one aspect of the present invention, a Base Station (BS) in a wireless communication system is provided. The BS includes a resource allocator for allocating periodic uplink (UL) resources to a terminal, and a control information generator for generating a resource allocation message for the terminal using resource allocation information from the resource allocator, and for generating and outputting control information including the generated resource allocation message.

According to one aspect of the present invention, a terminal in a wireless communication system is provided. The terminal includes a control information interpreter for interpreting control information received from a BS, and a transmitter for transmitting UL data using allocated periodic resources by set periods when the periodic UL resources are allocated to the terminal according to the interpretation.

According to another aspect of the present invention, a communicating method of a BS in a wireless communication system is provided. The method includes allocating periodic UL resources to a terminal, generating a resource allocation message including resource allocation information relating to the terminal, and transmitting control information containing the generated resource allocation message.

According to a further aspect of the present invention, a communicating method of a terminal in a wireless communication system in provided. The method includes interpreting control information received from a BS, and transmitting UL data using allocated periodic resources by set periods when the periodic UL resources are allocated to the terminal according to the interpretation.

BRIEF DESCRIPTION OF THE DRAWINGS

The above and other aspects, features and advantages of certain exemplary embodiments of the present invention will become more apparent from the following detailed description taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of the exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

An exemplary embodiment of the present invention provides a method for periodically allocating uplink resources in a broadband wireless communication system.

In exemplary implementation, the broadcast wireless communication system includes an Orthogonal Frequency Division Multiplexing (OFDM) or an Orthogonal Frequency Division Multiple Access (OFDMA) communication system. While the broadband wireless access communication system using multiple subcarriers is explained as an example, the present invention is applicable to other wireless access communication systems.

Figure 2:
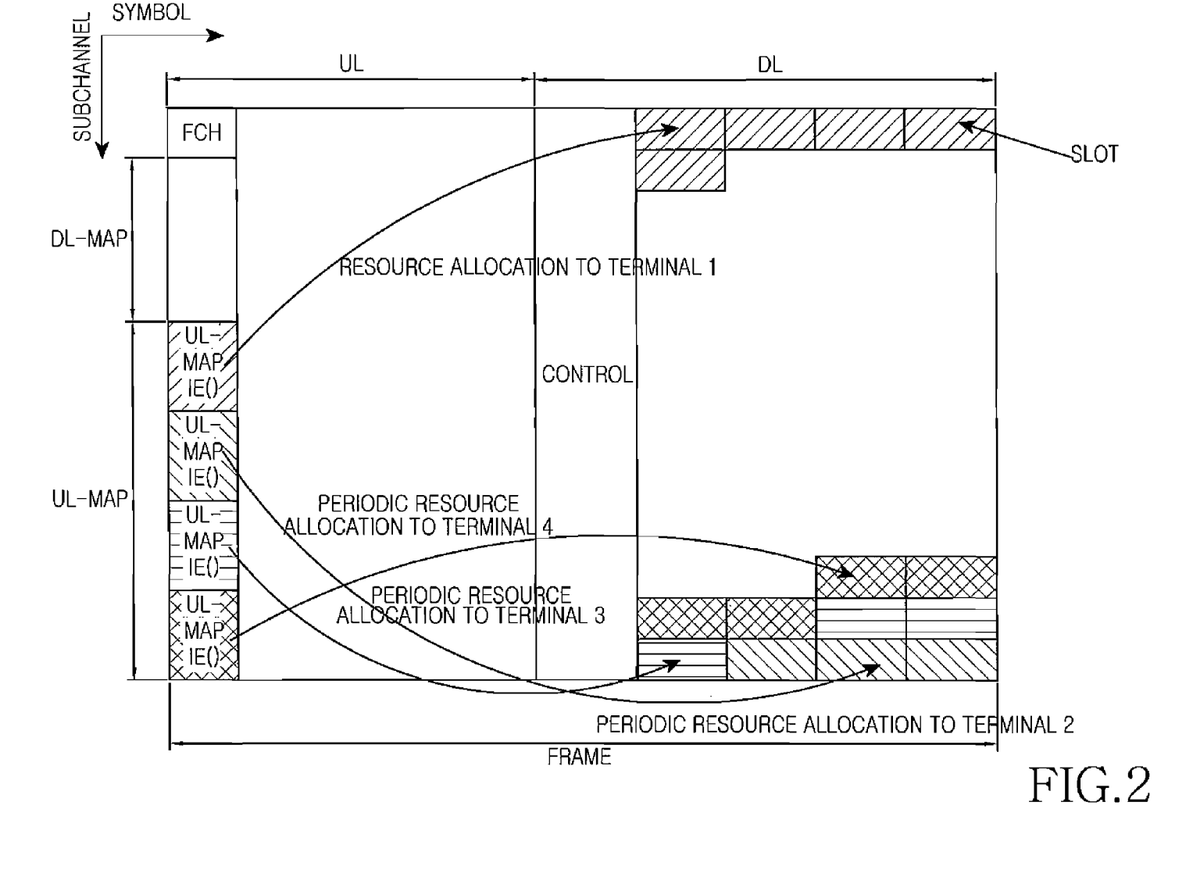
FIG. 2 depicts a periodic uplink resource allocating method in a broadband wireless communication system according to an exemplary embodiment of the present invention.

FIG. 2 depicts a periodic uplink resource allocating method in a broadband wireless communication system according to an exemplary embodiment of the present invention.

In FIG. 2, when periodic uplink resource allocation is requested according to a terminal's request or a Base Station (BS)'s determination, the BS performs the periodic allocation (PA) with respect to corresponding terminals. Of four terminals requiring the uplink resource allocation, three terminals are assigned the periodic resources in FIG. 2. Specifically, three slots from the last slot are allotted to the terminal 2, three slots from the fourth slot are allotted to the terminal 3, and four slots from the seventh slot are allotted to the terminal 4. The periodic resource allocation proceeds from the last slot of the uplink (UL) frame in order, and the general resource allocation proceeds from the first slot of the UL frame in order. The terminals allocated the periodic resources transmit UL data over the slots periodically allocated over durations designated by the BS.

Table 2 shows UL-MAP IE( ) for allocating the periodic UL resource.

TABLE 2

```
UL-MAP IE( ) {
    CID
    UIUC
    Duration
    Repetition coding indication
    Allocation Type
    if (Allocation Type == 0) {
    } else if (Allocation Type == 1) {
        PA start offset
        PA duration
        PA period
    } else if (Allocation Type == 2) {
        Non=PA start offset
    }
}
```

In Table 2, the resource allocating message UL-MAP IE( ) includes Connection IDentifier (CID) information for distinguishing services and terminals, Uplink Interval Usage Code (UIUC) information for designating a modulation scheme, Duration information for indicating a number of allotted slots, and Repetition coding indication information for designating a number of repetition codings. In addition, UL-MAP IE( ) further includes the following information according to Allocation Type. The Allocation Type is an identifier for distinguishing the resource allocation schemes. When Allocation Type is '1', UL-MAP IE( ) further includes PA start offset information for designating the start slot, PA duration information for designating the PA duration, and PA period information for designating the data transfer period. The Allocation Type '1' denotes the periodic resource allocation. If the Allocation Type is '2', UL-MAP IE( ) includes Non-PA start offset information for designating the start slot of the periodic resource allocation. The Allocation Type '2' denotes that the periodic resources are allocated to a general terminal. With the Allocation Type '1', the PA start offset information recorded in the resource allocation message becomes the slot number counted from the last slot of the UL frame. With the Allocation Type '2', the Non-PA start offset information recorded in the resource allocation message becomes the slot number counted from the first slot of the UL frame. Alternatively, even when the Allocation Type is '2', the slot number counted from the last slot of the UL frame can be used as the start offset information. That is, when the Allocation Type is '1', the terminal recognizes the duration back from the slot indicated by the start offset information as its allotted resources.

The terminal receives the resource allocation message of Table 2, determines whether the periodic resources are allocated to itself using the Allocation Type of the resource allocation message, and sends UL data to the BS using the allotted periodic resources (slots) over the designated PA duration when the periodic resources are allotted. In doing so, if the PA duration is not designated, the terminal can occupy the periodic resources until a separate deallocation message is received. That is, in the periodic resource allocation, the BS does not have to send the resource allocation message to the corresponding terminal in every frame. Thus, the size (resource) occupied by the control information (MAP information) in the frame can be reduced.

Figure 3:
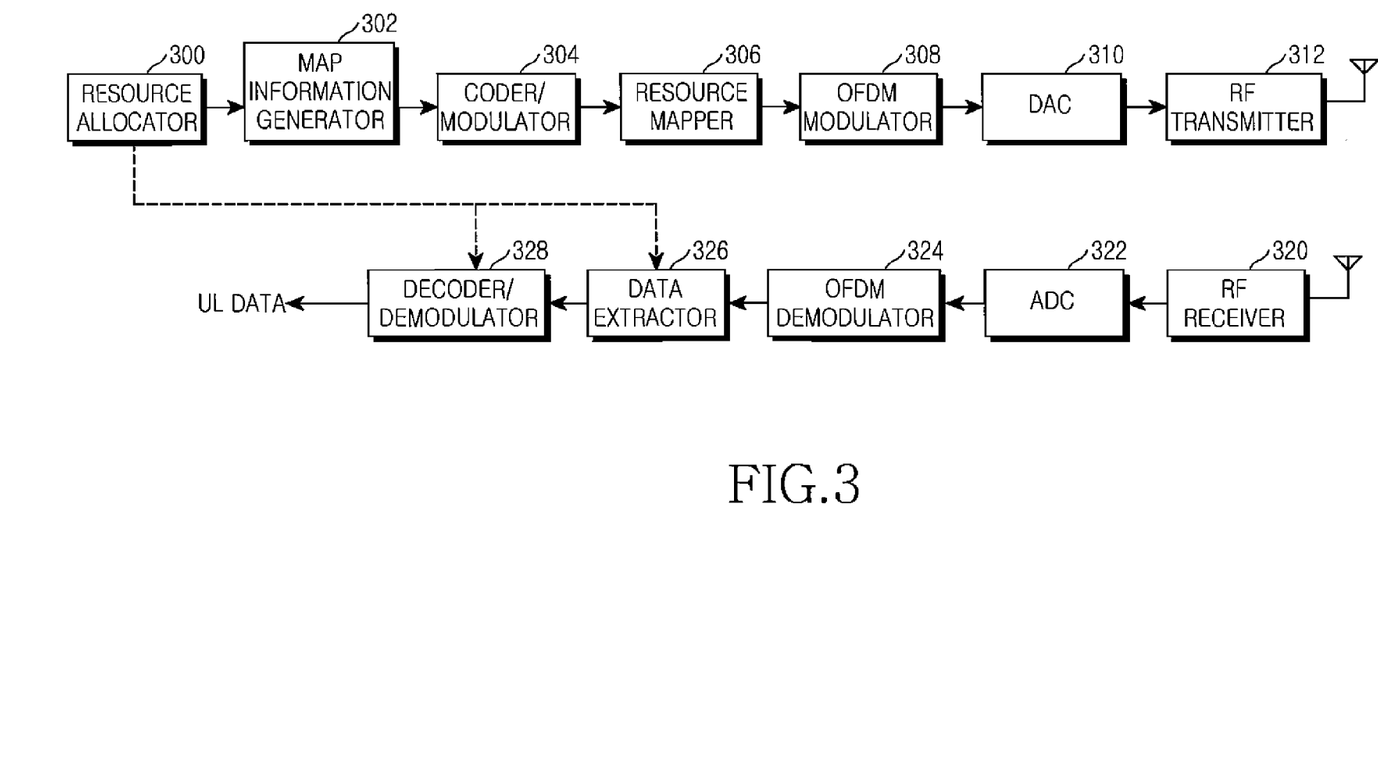
FIG. 3 depicts a structure of Base Station (BS) in the broadband wireless communication system according to an exemplary embodiment of the present invention.

FIG. 3 depicts a structure of a BS in the broadband wireless communication system according to an exemplary embodiment of the present invention.

The BS of FIG. 3 includes a resource allocator 300, a MAP information generator 302, a coder/modulator 304, a resource mapper 306, an OFDM modulator 308, a digital-to-analog converter (DAC) 310, a radio frequency (RF) transmitter 312, an RF receiver 320, an analog-to-digital converter (ADC) 322, an OFDM demodulator 324, a data extractor 326, and a decoder/demodulator 328. The following explanation describes operations of transmitting MAP information and receiving UL data from a terminal allocated the periodic resources.

The resource allocator 300 in FIG. 3 schedules resources using channel information (e.g., Channel Quality Information (CQI)), the requested bandwidth, and the service type with respect to each terminal and provides the scheduling result (resource allocation information) to the MAP information generator 302. The resource allocator 300 determines terminals to be allocated the periodic UL resources on a certain basis and allocates the periodic resources starting from the last slot of UL frame in order as shown in FIG. 2. Also, the resource allocator 300 controls overall transmission and reception of the BS according to the scheduling result. The scheduling algorithm can use a proportional fairness algorithm, a Round Robin algorithm, and the like.

The MAP information generator 302 generates and outputs MAP information (DL-MAP/UL-MAP) using the resource allocation information fed from the resource allocator 300. The MAP information includes resource allocation messages (Table 2) transmitted to terminals. The coder/modulator 304 encodes and modulates the MAP information from the MAP information generator 302 according to preset schemes. As the MAP information is to be received at every terminal, the coder/modulator 304 can encode and modulate the MAP information using a robust modulation scheme (e.g., QPSK, R=½, Repetition=6).

The resource mapper 306 maps the data from the coder/modulator 304 to a preset resource (e.g., front duration of frame). The OFDM modulator 308 generates OFDMA symbols by OFDM-modulating the mapped data fed from the resource mapper 306. Herein, the OFDM modulation includes an Inverse Fast Fourier Transform (IFFT) process, a Cyclic Prefix (CP) insertion, and so forth.

The DAC 310 converts the sample data from the OFDM modulator 308 to an analog signal. The RF transmitter 312 converts the baseband signal from the DAC 310 to an RF signal and transmits the RF signal on an antenna. The terminals, receiving the MAP information, receive downlink (DL) data from the BS and send UL data to the BS according to the MAP information. Now, operations of receiving the UL data from the terminal allocated the periodic UL resources are illustrated.

The RF receiver 320 converts the RF signal received from the terminal to a baseband signal and outputs the baseband signal. The ADC 322 converts the analog baseband signal from the RF receiver 320 to digital sample data. The OFDM demodulator 324 outputs subcarrier values (frequency-domain data) by OFDM-demodulating the sample data fed from the ADC 322. Herein, the OFDM demodulation includes a CP elimination, a Fast Fourier Transform (FFT) process, and so forth.

The resource allocator 300 controls the data extractor 326 and the decoder/demodulator 328 to periodically receive the UL data from the terminal allocated the periodic UL resources.

The data extractor 326 extracts data corresponding to the periodic resources (slots) allotted to the terminal from the frequency-domain data fed from the OFDM demodulator 324, and outputs the extracted data to the decoder/demodulator 328. The decoder/demodulator 328 restores the UL data of the terminal by demodulating and decoding the data fed from the data extractor 326 according to a prescribed Modulation and Coding Scheme (MCS).

Figure 4:
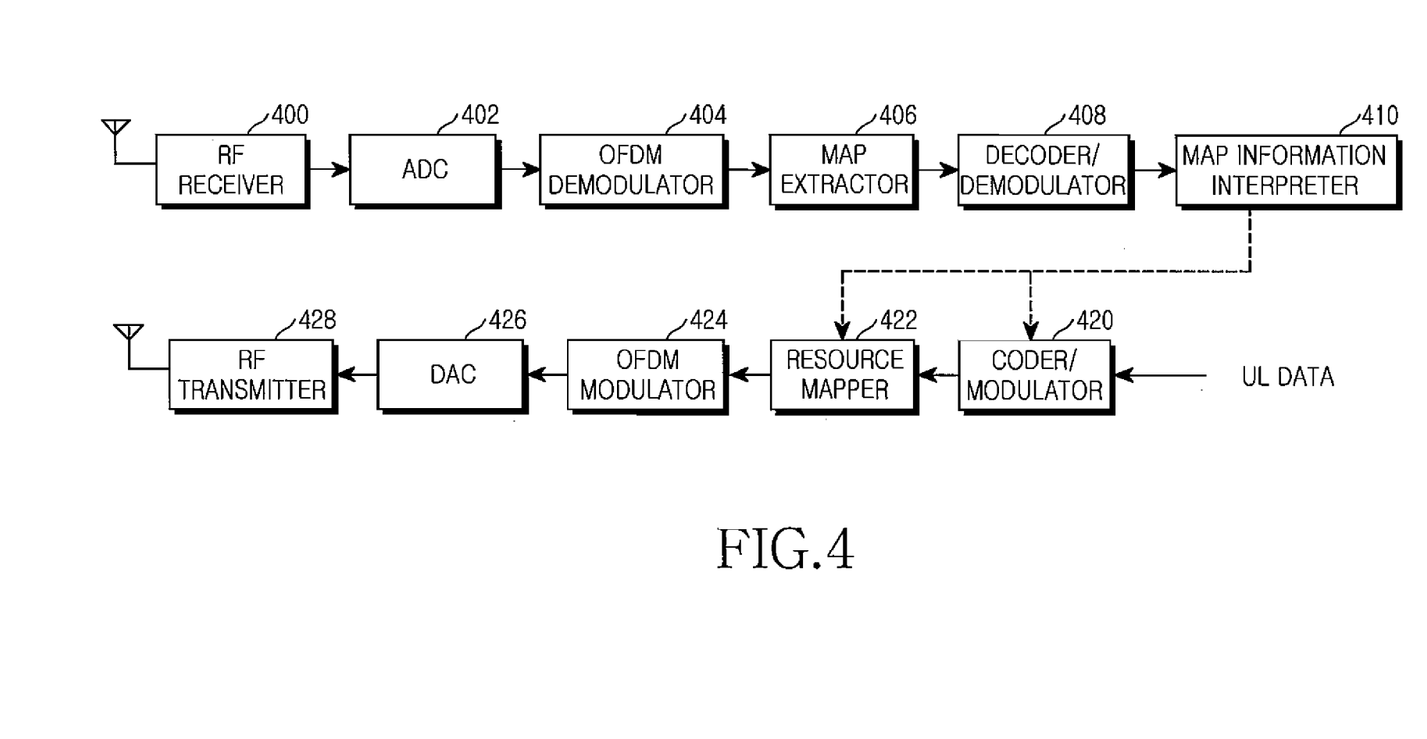
FIG. 4 depicts a structure of a terminal in the broadband wireless communication system according to an exemplary embodiment of the present invention.

FIG. 4 depicts a structure of a terminal in a broadband wireless communication system according to an exemplary embodiment of the present invention.

Referring to FIG. 4, the terminal includes an RF receiver 400, an ADC 402, an OFDM demodulator 404, a MAP extractor 406, a decoder/demodulator 408, a MAP information interpreter 410, a coder/modulator 420, a resource mapper 422, an OFDM modulator 424, a DAC 426, and an RF transmitter 428. The following explanation describes operations of receiving MAP information from the BS and transmitting UL data using the periodic resources allocated from the BS.

The RF receiver 400 in FIG. 4 converts the RF signal received from the BS to a baseband signal. The ADC 402 converts the analog baseband signal from the RF processor 400 to digital sample data and outputs the digital sample data. The OFDM demodulator 404 outputs subcarrier values (frequency-domain data) by OFDM-demodulating the sample data from the ADC 402. Herein, the OFDM demodulation includes a CP elimination, an FFT operation, and so forth.

The MAP extractor 406 extracts MAP data received in a preset area of the frame from the data fed from the OFDM demodulator 404. The decoder/demodulator 408 outputs MAP information by demodulating and decoding the data from the MAP extractor 406 according to a preset scheme. The MAP information interpreter 410 interprets the MAP information fed from the decoder/demodulator 408, and controls overall transmission and reception of the terminal according to the MAP information. Now, operations of transmitting the UL data using the allocated periodic resources are illustrated.

When the periodic UL resources are allocated to the terminal, the MAP information interpreter 410 controls the coder/modulator 420 and the resource mapper 422 to periodically transmit UL data. The coder/modulator 420 encodes and modulates UL data using a prescribed MSC level by the designated data transfer periods. The resource mapper 422 maps the data from the coder/modulator 420 to the periodic resources (slots) allotted to the terminal, and outputs the mapped data.

The OFDM modulator 424 OFDM-modulates the mapped data fed from the resource mapper 422. The DAC 426 converts the sample data from the OFDM modulator 424 to an analog signal. The RF processor 428 converts the baseband signal from the DAC 426 to an RF signal and transmits the RF signal to the BS on an antenna.

Figure 5:
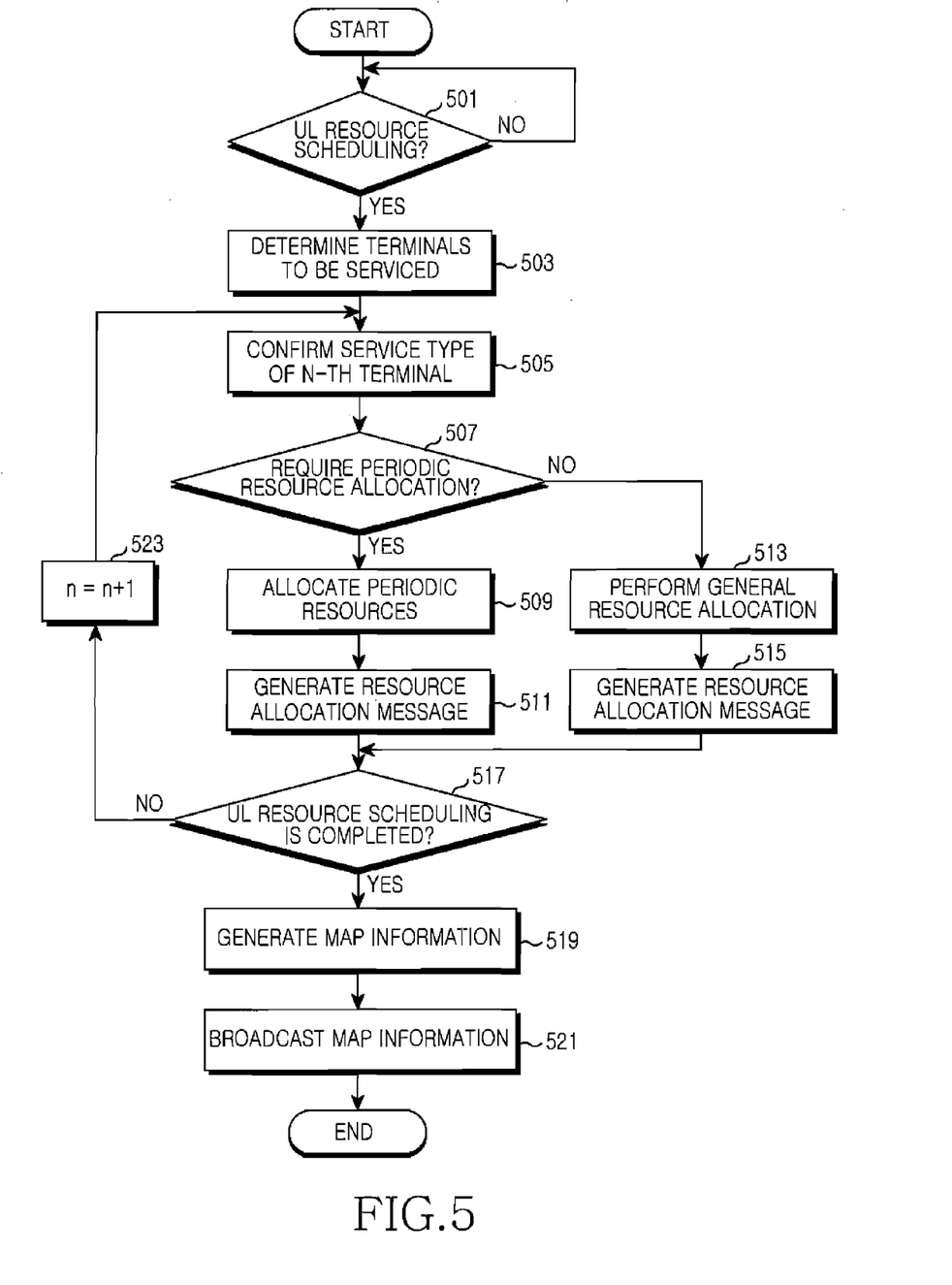
FIG. 5 illustrates operations of the BS in the broadband wireless communication system according to an exemplary embodiment of the present invention.

FIG. 5 illustrates operations of a BS in a broadband wireless communication system according to an exemplary embodiment of the present invention.

Referring to FIG. 5, the BS determines whether the UL resource scheduling is requested in step 501. When the UL resource scheduling is requested, the BS determines terminals requiring the UL resource allocation and initializes a terminal index n to '1' in step 503. The terminals requiring the UL resource allocation may be terminals that transmitted the bandwidth request message.

The BS determines the service type of n-th terminal in step 505 and determines whether the periodic resource allocation is necessary based on the service type in step 507. For instance, the BS can define the service of the periodic packet generation (e.g., VoIP service) as the service requiring the periodic resource allocation.

When the periodic resource allocation is needed for the terminal, the BS allots the periodic resources to the terminal in step 509. In doing so, the BS determines the number of slots (Duration), the allocation duration (PA duration), the transmission period (PA period), and the start point of the allocated resources (PA start offset). In step 511, the BS generates a resource allocation message (Table 2) to be transmitted to the terminal based on the periodic resources allocated to the terminal. At this time, the Allocation Type of the resource allocation message is '1'.

When the periodic resource allocation is not needed for the terminal, the BS allocates the resources to the terminal using the general scheme which allocates the resources starting from the first slot of the UL frame in step 513. In step 515, the BS generates a resource allocation message (Table 2) to be transmitted to the terminal based on the resource allocation result. At this time, the Allocation Type of the resource allocation message is '0'.

After generating the resource allocation message for the n-th terminal, the BS determines whether the UL resource scheduling is completed in step 517. When the UL resource scheduling is not completed, the BS increases the value n by one in step 523 and returns to step 505. When the UL resource scheduling is completed, the BS generates MAP information with the resource allocation messages in step 519. The BS broadcasts the generated MAP information to the terminals in step 521. Next, the BS sends DL data and receives UL data according to the MAP information. Particularly, when there exists a terminal allocated the periodic UL resources, the BS receives the UL data of the terminal over the allotted slots by the set periods.

While the BS determines whether to allocate the periodic resources by taking into account the service type, the periodic resource allocation can be determined by the terminal's request. In an exemplary embodiment, the BS finally determines whether to allocate the periodic resources even when the terminal requests the periodic resource allocation.

Figure 6:
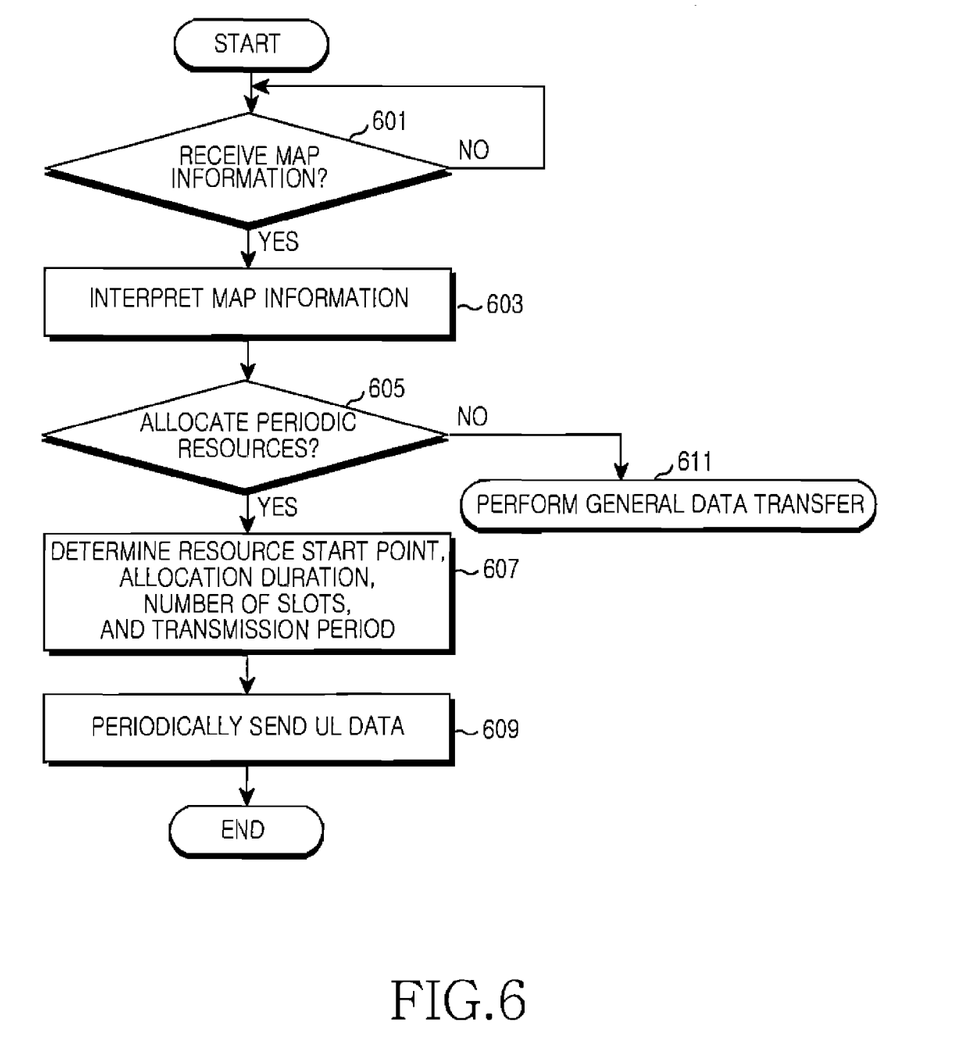
FIG. 6 illustrates operations of the terminal in the broadband wireless communication system according to an exemplary embodiment of the present invention.

FIG. 6 illustrates operations of a terminal in a broadband wireless communication system according to an exemplary embodiment of the present invention.

Referring to FIG. 6, the terminal determines whether the broadcast MAP information is received from the BS in step 601. When the MAP information is received, the terminal checks the resource allocation state of the DL frame and the UL frame by interpreting the received MAP information in step 603. In other words, the terminal recognizes the allocated DL resources and the allocated UL resources by interpreting the MAP information.

After interpreting the MAP information, the terminal determines whether the periodic UL resources are allocated in step 605. When the general resource allocation is performed, the terminal transmits UL data using resources designated in the corresponding resource allocation message in step 611.

When the periodic UL resources are allocated, the terminal determines the start point of the allotted resources, the amount of the resources (the number of slots), the allocation duration, and the transmission period in step 607. In step 609, the terminal sends the UL data over the periodically allocated slots according to the determined parameters.

If the service is terminated or paused while the terminal periodically sends the UL data, the resources occupied by the terminal should be allocated to another terminal. For instance, when the resources are allocated to the terminal 2, terminal 3, and terminal 4 in the PA manner as shown in FIG. 2 and the service of the terminal 3 ends, the resources from the last slot are reallocated to the terminal 2 and the terminal 4 in the PA manner. Hence, the resources occupied by the terminal 3 can be reused without wasting them.

If the service of the terminal 3 is temporarily paused, the resources occupied by the terminal 3 can be allocated to another general terminal. In this case, the Allocation Type defined in Table 2 is '2'. The Allocation Type '2' corresponds to the general terminal and accordingly, the BS sends the resource allocation message containing Non-PA start offset information to thus allocate the resources occupied by the terminal 3 to the general terminal, which is described in more detail below.

Figure 7:
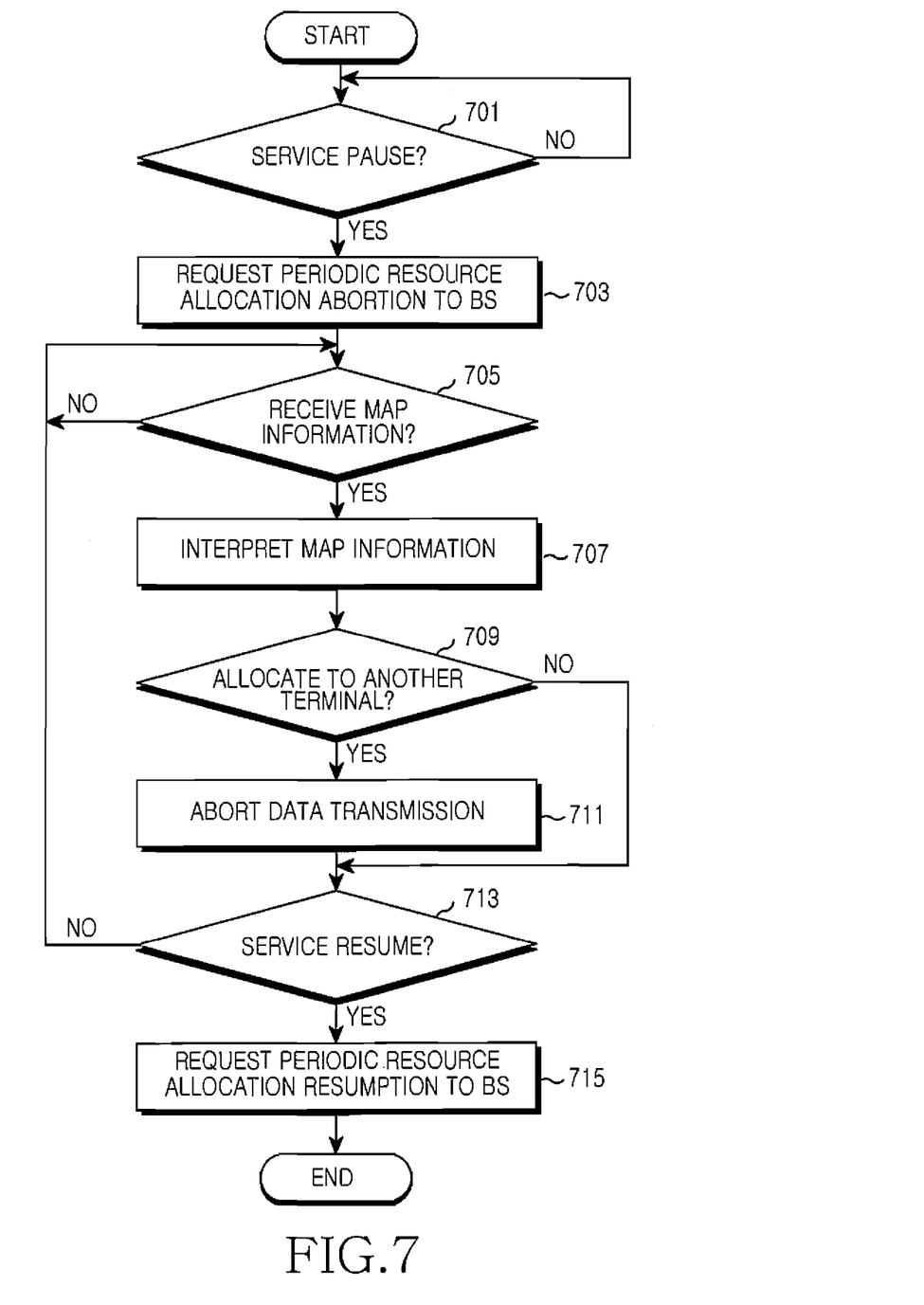
FIG. 7 illustrates operations of the terminal for processing service pause in the broadband wireless communication system according to an exemplary embodiment of the present invention.

FIG. 7 illustrates operations of a terminal for processing a temporary pause of a service allocated periodic resources in the broadband wireless communication system according to an exemplary embodiment of the present invention.

Referring to FIG. 7, while the terminal is providing services with the resources allocated in the PA manner, the terminal determines whether the service is paused in step 701. For instance, when there is no data to send over a certain time, the terminal can determine the service pause. Alternatively, by monitoring the data loading status or queue, the service pause can be determined. When the service pause is detected, the terminal requests the abortion of the periodic resource allocation to the BS in step 703.

The abortion of the periodic resource allocation can be requested in various ways. For example, piggybacking can be used to add predefined information to the last packet being sent. Alternatively, a predefined message can be transmitted. In this case, the message is sent using the resources allocated to transmit the control information or using the resources allocated to the terminal.

As above, after requesting the abortion of the periodic resource allocation, the terminal determines whether the MAP information broadcast from the BS is received or not in step 705. When the MAP information is received, the terminal examines the resource allocation state of the DL frame and the UL frame by interpreting the received MAP information in step 707.

In step 709, the terminal determines whether the pre-allocated periodic resources are allotted to another terminal. When the resources are not allotted to another terminal, the terminal proceeds to step 713. When the resources are allotted to another terminal, the terminal aborts the transmission of the UL data in step 711 and then proceeds to step 713. That is, although UL data to be transmitted exists, when the pre-allocated periodic resources are allotted to another terminal, the terminal does not send the UL data.

Next, the terminal determines whether the service is resumed in step 713. When the service restart is not detected, the terminal returns to step 705 to receive next MAP information. When detecting the service restart, the terminal requests the resumption of the periodic resource allocation to the BS in step 715.

The resumption of the periodic resource allocation can be requested in various manners. For example, the resumption of the periodic resource allocation can be requested by transmitting a predefined Channel Quality Indication CHannel (CQICH) codeword. CQICH is a channel used by the terminal to feed the measured UL channel quality back to the BS. Alternatively, a predefined message can be transmitted for the resumption of the periodic resource allocation. This message can be sent using the resources allocated for the control information or the periodic resources allotted to the terminal.

Figure 8:
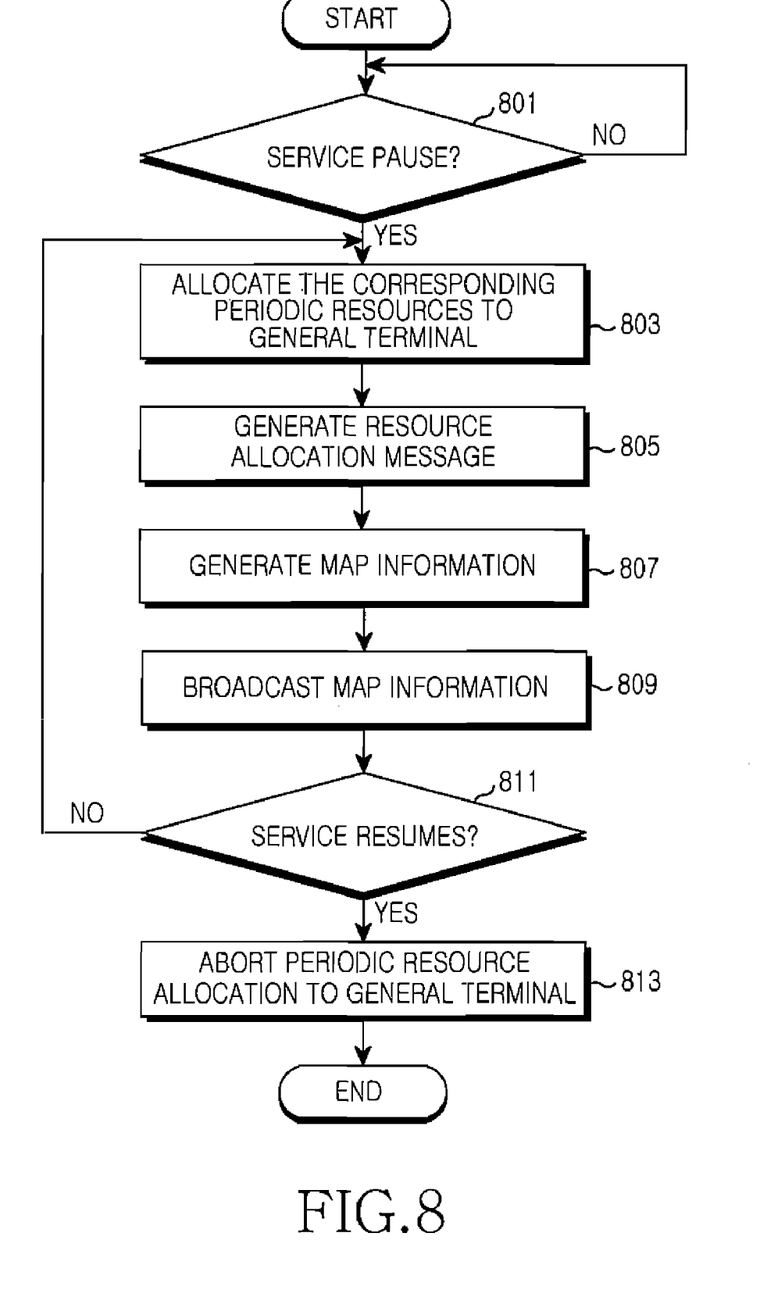
FIG. 8 illustrates operations of the BS for processing service pause in the broadband wireless communication system according to an exemplary embodiment of the present invention.

FIG. 8 illustrates operations of a BS for processing a pause of service allocated periodic resources in a broadband wireless communication system according to an exemplary embodiment of the present invention.

Referring to FIG. 8, the BS determines whether the service allocated the periodic resources is paused in step 801. For example, when the abortion request of the periodic resource allocation is received from the terminal or when the UL data is not received from the terminal for a certain time, the BS determines the service pause.

Upon determining the service pause, the BS allocates the periodic resources of the corresponding frame to the general terminal in step 803. In step 805, the BS generates a resource allocation message (Table 2) to be sent to the general terminal. At this time, the Allocation Type is '2' and accordingly, the resource allocation message includes Non-PA start offset information of the resources allotted to the general terminal.

The BS generates MAP information including the resource allocation message in step 807 and broadcasts the generated MAP information to terminals in step 809. Next, the BS transmits DL data and receives UL data according to the MAP information. In step 811, the BS determines whether the paused service is resumed. For instance, when the resumption request for the periodic resource allocation is received from the terminal or the UL data is received from the terminal, the BS can determine the service resumption.

When the service resumption is not detected, the BS returns to step 803 to re-allocate the corresponding periodic resources to a general terminal. When detecting the service resumption, the BS aborts the periodic resource allocation to the general terminal in step 813. In other words, the BS resumes operations for periodically receiving the UL data from the corresponding terminal according to the original purpose of the periodic resources without a separate resource allocation.

As set forth above, by periodically allocating the UL resources for the UL transmission from the terminal, the BS does not have to send the resource allocation information to the terminal in every period. The resource efficiency can be enhanced by reducing the amount of the control messages broadcast in the downlinks. That is, the system throughput can be increased by reducing the size occupied by the control information in the frame.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A Base Station (BS) in a wireless communication system, comprising:
    a resource allocator for allocating periodic uplink (UL) resources to a terminal; and
    a control information generator for generating a resource allocation message for the terminal using resource allocation information from the resource allocator, and for generating control information including the generated resource allocation message, the resource allocation message including additional information according to an allocation type specifying a resource allocation scheme, the resource allocation type indicating whether UL resources are allocated periodically or non-periodically,
    wherein, when the UL resources are allocated to the terminal non-periodically, the UL resources are allocated for the terminal in each frame, and the BS transmits the resource allocation message to the terminal in each frame,
    wherein, when the UL resources are allocated to the terminal periodically, the UL resources are allocated to the terminal for a plurality of frames, and the BS does not transmit the resource allocation message to the terminal during each frame, and
    wherein, when the resource allocation type is periodic allocation, the additional information of the resource allocation message comprises at least one of an amount of resources, a resource start point, an allocation duration, and a transmission period.

2. The BS of claim 1, further comprising:
    a transmitter for transmitting the control information from the control information generator.

3. The BS of claim 1, wherein the control information comprises MAP information.

4. The BS of claim 1, further comprising:
    a receiver for receiving UL data from the terminal using the allocated periodic UL resources by corresponding periods.

5. The BS of claim 1, wherein the amount of the resources comprises a number of slots and the resource start point comprises a slot number counted from a last slot of a UL frame.

6. The BS of claim 1, wherein the resource allocator allocates the periodic UL resources from the end of the UL frame in order.

7. The BS of claim 1, wherein the resource allocator allocates the periodic UL resources to a terminal which requests a service having periodic packet generation.

8. The BS of claim 1, wherein, when a service of the terminal is terminated, the resource allocator re-allocates resources to terminals allocated the periodic UL resources.

9. The BS of claim 1, wherein, when a service of the terminal is terminated or paused, the resource allocator allocates the periodic resources occupied by the terminal to another terminal.

10. The BS of claim 9, wherein a resource allocation message sent to the another terminal comprises at least one of an amount of resources and a resource start point.

11. The BS of claim 10, wherein the amount of the resources comprises a number of slots, and the resource start point comprises a slot number counted from the start of the UL frame.

12. The BS of claim 9, wherein the service pause is detected by a periodic resource allocation abortion request received from the terminal.

13. The BS of claim 9, wherein, when the paused service is resumed, the resource allocator aborts the allocating of the periodic resources occupied by the terminal to another terminal.

14. The BS of claim 13, wherein the service resumption is detected by a periodic resource allocation resumption request received from the terminal.

15. The BS of claim 13, wherein the service resumption is detected by a specific sequence received from the terminal.

16. The BS of claim 15, wherein the specific sequence is received over a Channel Quality Indication CHannel (CQICH).

17. A terminal in a wireless communication system, comprising:
a control information interpreter for interpreting control information received from a Base Station (BS), the control information including additional information according to an allocation type specifying a resource allocation scheme, and the resource allocation type indicating whether UL resources are allocated periodically or non-periodically; and
a transmitter for transmitting uplink (UL) data using allocated periodic resources by set periods when the periodic UL resources are allocated to the terminal according to the interpretation,
wherein, when the UL resources are allocated to the terminal non-periodically, the UL resources are allocated for the terminal in each frame, and the resource allocation message is received by the terminal in each frame,
wherein, when the UL resources are allocated to the terminal periodically, the UL resources are allocated to the terminal for a plurality of frames, and the resource allocation message is not received by the terminal during each frame, and
wherein, when the resource allocation type is periodic allocation, the additional information of the resource allocation message comprises at least one of an amount of resources, a resource start point, an allocation duration, and a transmission period.

18. The terminal of claim 17, wherein the control information comprises MAP information.

19. The terminal of claim 17, wherein the control information comprises a resource allocation message containing resource information allocated to the terminal.

20. The terminal of claim 19, wherein the amount of the resources comprises a number of slots, and the resource start point comprises a slot number counted from a last slot of a UL frame.

21. The terminal of claim 19, wherein, when a service allocated the periodic resources is paused, the transmitter sends a periodic resource allocation abortion request to the BS.

22. The terminal of claim 21, wherein the transmitter sends the periodic resource allocation abortion request using at least one of a piggybacking which adds specific information to UL data and a separate control message.

23. The terminal of claim 21, wherein, when the paused service is resumed, the transmitter sends a periodic resource allocation resumption request to the BS.

24. The terminal of claim 21, wherein, when the paused service is resumed, the transmitter sends a periodic resource allocation resumption request to the BS using a specific sequence.

25. The terminal of claim 24, wherein the specific sequence is transmitted over a Channel Quality Indication CHannel (CQICH).

26. A communicating method of a Base Station (BS) in a wireless communication system, the method comprising:
allocating periodic uplink (UL) resources to a terminal;
generating a resource allocation message including resource allocation information relating to the terminal and additional information according to an allocation type specifying a resource allocation scheme, the resource allocation type indicating whether UL resources are allocated periodically or non-periodically; and
transmitting control information containing the generated resource allocation message,
wherein, when the UL resources are allocated to a terminal non-periodically, the UL resources are allocated for the terminal in each frame, and the resource allocation message is transmitted to the terminal in each frame,
wherein, when the UL resources are allocated to the terminal periodically, the UL resources are allocated to the terminal for a plurality of frames, and the resource allocation message is not transmitted to the terminal during each frame, and
wherein, when the resource allocation type is periodic allocation, the additional information of the resource allocation message comprises at least one of an amount of resources, a resource start point, an allocation duration, and a transmission period.

27. The communicating method of claim 26, wherein the control information comprises MAP information.

28. The communicating method of claim 26, further comprising:
receiving UL data from the terminal using the allocated periodic resources by corresponding periods.

29. The communicating method of claim 26, wherein the amount of the resources is a number of slots, and the resource start point is a slot number counted from a last slot of a UL frame.

30. The communicating method of claim 26, wherein the allocating of periodic UL resources comprises:
determining terminals to be allocated periodic UL resources on a certain basis; and
allocating the periodic resources from the end of a UL frame to the terminals in order.

31. The communicating method of claim 26, wherein the terminal comprises a terminal which requests a service having a periodic packet generation.

32. The communicating method of claim 26, further comprising:
when a service of the terminal is terminated, re-allocating the resources to the terminals allocated the periodic UL resources.

33. The communicating method of claim 26, further comprising:
when a service of the terminal is terminated or paused, allocating the periodic resources occupied by the terminal to another terminal.

34. The communicating method of claim 33, wherein a resource allocation message sent to the another terminal comprises at least one of an amount of resources and a resource start point.

35. The communicating method of claim 34, wherein the amount of the resources is a number of slots, and the resource start point is a slot number counted from the first slot of a UL frame.

36. The communicating method of claim 33, further comprising detecting the service pause by a periodic resource allocation abortion request received from the terminal.

37. The communicating method of claim 33, further comprising:
resuming the paused service; and
aborting the allocating of the periodic resources occupied by the terminal to the another terminal.

38. The communicating method of claim 37, further comprising detecting the service resumption by a periodic resource allocation resumption request received from the terminal.

39. The communicating method of claim 37, further comprising detecting the service resumption by a specific sequence received from the terminal.

40. The communicating method of claim 39, wherein the specific sequence is received over a Channel Quality Indication CHannel (CQICH).

41. A communicating method of a terminal in a wireless communication system, the method comprising:
interpreting control information received from a Base Station (BS), the control information including additional information according to an allocation type specifying a resource allocation scheme, the resource allocation type indicating whether UL resources are allocated periodically or non-periodically; and
transmitting uplink (UL) data using allocated periodic resources by set periods when the periodic UL resources are allocated to the terminal according to the interpretation of the resource allocation type contained in the control information,
wherein, when the UL resources are allocated to a terminal non-periodically, the UL resources are allocated for the terminal in each frame, and the resource allocation message is received by the terminal in each frame,
wherein, when the UL resources are allocated to the terminal periodically, the UL resources are allocated to the terminal for a plurality of frames, and the resource allocation message is not received by the terminal during each frame, and
wherein, when the resource allocation type is periodic allocation, the additional information of the resource allocation message comprises at least one of an amount of resources, a resource start point, an allocation duration, and a transmission period.

42. The communicating method of claim 41, wherein the control information comprises MAP information.

43. The communicating method of claim 41, wherein the control information comprises a resource allocation message containing resource information allocated to the terminal.

44. The communicating method of claim 43, wherein the amount of the resources comprises a number of slots, and the resource start point comprises a slot number counted from a last slot of a UL frame.

45. The communicating method of claim 41, further comprising:
when a service allocated the periodic resources is paused, transmitting a periodic resource allocation abortion request to the BS.

46. The communicating method of claim 45, wherein the transmitting of the periodic resource allocation abortion request comprises using at least one of a piggybacking which adds specific information to UL data and a separate control message.

47. The communicating method of claim 45, further comprising:
when the paused service is resumed, transmitting a periodic resource allocation resumption request to the BS.

48. The communicating method of claim 45, further comprising:
resuming the paused service; and
transmitting a periodic resource allocation resumption request to the BS using a specific sequence.

49. The communicating method of claim 48, wherein the specific sequence is transmitted over a Channel Quality Indication CHannel (CQICH).

50. A communication method of a Base Station(BS) in wireless communication system, the method comprising:
generating a resource allocation message to allocate periodic uplink(UL) resources to a terminal including additional information according to an allocation type specifying a resource allocation scheme, the resource allocation type indicating whether UL resources are allocated periodically or non-periodically; and
transmitting the resource allocation message to the terminal,
wherein, when the UL resources are allocated to a terminal non-periodically, the UL resources are allocated for the terminal in each frame, and the BS transmits the resource allocation message to the terminal in each frame,
wherein, when the UL resources are allocated to the terminal periodically, the UL resources are allocated to the terminal for a plurality of frames, and the BS transmits the resource allocation message to the terminal only during frames in which a resource allocation to the terminal is changed, and
wherein, when the resource allocation type is periodic allocation, the additional information of the resource allocation message comprises at least one of an amount of resources, a resource start point, an allocation duration, and a transmission period.

51. The communication method of claim 50, wherein the resource start point is a slot number counted from a last slot of a UL frame.

* * * * *